United States Patent
Trimble et al.

(10) Patent No.: US 7,109,883 B2
(45) Date of Patent: Sep. 19, 2006

(54) LOW POWER PHYSICAL LAYER FOR A BUS IN AN INDUSTRIAL TRANSMITTER

(75) Inventors: Steven R. Trimble, Prior Lake, MN (US); Kelly M. Orth, Apple Valley, MN (US); Richard L. Nelson, Chanhassen, MN (US); David G. Tyson, Eden Prairire, MN (US)

(73) Assignee: Rosemount Inc., Eden Prairie, MN (US)

( * ) Notice: Subject to any disclaimer, the term of this patent is extended or adjusted under 35 U.S.C. 154(b) by 855 days.

(21) Appl. No.: 10/236,874

(22) Filed: Sep. 6, 2002

(65) Prior Publication Data

US 2004/0046722 A1   Mar. 11, 2004

(51) Int. Cl.
*H04B 1/38* (2006.01)

(52) U.S. Cl. .................. 340/870.16; 455/69; 455/73

(58) Field of Classification Search ............ 340/855.5, 340/855.9, 870.3, 870.31, 870.43, 870.16, 340/870.18, 870.32, 870.39, 870.4; 455/69, 455/73, 70, 87, 91
See application file for complete search history.

(56) References Cited

U.S. PATENT DOCUMENTS

| | | | |
|---|---|---|---|
| 3,701,280 A | 10/1972 | Stroman | 73/194 |
| 3,968,694 A | 7/1976 | Clark | 73/398 |
| 4,120,206 A | 10/1978 | Rud, Jr. | 73/718 |
| 4,125,027 A | 11/1978 | Clark | 73/724 |
| 4,238,825 A | 12/1980 | Geery | 364/510 |
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 364/510 |
| 4,419,898 A | 12/1983 | Zanker et al. | 73/861.02 |
| 4,446,730 A | 5/1984 | Smith | 73/301 |
| 4,455,875 A | 6/1984 | Guimard et al. | 73/708 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 364/509 |
| 4,617,607 A | 10/1986 | Park et al. | 361/283 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |

(Continued)

FOREIGN PATENT DOCUMENTS

DE    37 41 648 A1    7/1988

(Continued)

OTHER PUBLICATIONS

U.S. Appl. No. 09/862,762, filed May 21, 2001, Wang.

(Continued)

*Primary Examiner*—Michael Horabik
*Assistant Examiner*—Hung Q. Dang

(57) ABSTRACT

A process variable transmitter connects a serial bus to an accessory load. A supply limiter circuit provides a first supply current limit and provides a stored energy output. A recessive driver circuit draws a drive current from the stored energy output and couples the drive current to the serial bus. The recessive driver circuit provides a drive current limit. A dominant driver circuit has a dominant state in which it conducts the drive current, and an inactive state in which the drive current is available to the accessory load.

24 Claims, 7 Drawing Sheets

U.S. PATENT DOCUMENTS

| | | | |
|---|---|---|---|
| 4,783,659 A | 11/1988 | Frick | 340/870.37 |
| 4,791,352 A | 12/1988 | Frick et al. | 324/60 |
| 4,798,089 A | 1/1989 | Frick et al. | 73/706 |
| 4,818,994 A | 4/1989 | Orth et al. | 340/870.21 |
| 4,825,704 A | 5/1989 | Aoshima et al. | 73/861.42 |
| 4,833,922 A | 5/1989 | Frick et al. | 73/756 |
| 4,850,227 A | 7/1989 | Luettgen et al. | 73/708 |
| 4,866,989 A | 9/1989 | Lawless | 73/756 |
| 4,881,412 A | 11/1989 | Northedge | 73/861.04 |
| 4,930,353 A | 6/1990 | Kato et al. | 73/727 |
| 4,958,938 A | 9/1990 | Schwartz et al. | 374/208 |
| 4,970,898 A | 11/1990 | Walish et al. | 73/706 |
| 4,980,675 A | 12/1990 | Meisenheimer, Jr. | 340/626 |
| 5,000,047 A | 3/1991 | Kato et al. | 73/706 |
| D317,266 S | 6/1991 | Broden et al. | D10/46 |
| D317,269 S | 6/1991 | Selg | D10/52 |
| D318,432 S | 7/1991 | Broden et al. | D10/46 |
| 5,028,746 A | 7/1991 | Petrich | 191/12.2 R |
| 5,035,140 A | 7/1991 | Daniels et al. | 73/290 |
| 5,051,937 A | 9/1991 | Kawate et al. | 364/571.01 |
| 5,058,437 A | 10/1991 | Chaumont et al. | 73/861.21 |
| 5,060,108 A | 10/1991 | Baker et al. | 361/283 |
| 5,070,732 A | 12/1991 | Duncan et al. | 73/431 |
| 5,083,091 A | 1/1992 | Frick et al. | 324/678 |
| 5,087,871 A | 2/1992 | Losel | 323/299 |
| 5,094,109 A | 3/1992 | Dean et al. | 73/718 |
| D329,619 S | 9/1992 | Cartwright | D10/52 |
| 5,142,914 A | 9/1992 | Kusakabe et al. | 73/723 |
| 5,157,972 A | 10/1992 | Broden et al. | 73/718 |
| 5,162,725 A | 11/1992 | Hodson et al. | 324/115 |
| 5,187,474 A | 2/1993 | Kielb et al. | 340/870.18 |
| 5,212,645 A | 5/1993 | Wildes et al. | 364/463 |
| 5,227,782 A | 7/1993 | Nelson | 340/870.11 |
| 5,236,202 A | 8/1993 | Krouth et al. | 277/164 |
| 5,245,333 A | 9/1993 | Anderson et al. | 340/870.3 |
| 5,248,167 A | 9/1993 | Petrich et al. | 285/23 |
| D342,456 S | 12/1993 | Miller et al. | D10/60 |
| 5,276,631 A | 1/1994 | Popovic et al. | 364/571.04 |
| 5,287,746 A | 2/1994 | Broden | 73/706 |
| 5,353,200 A | 10/1994 | Bodin et al. | 361/816 |
| 5,369,386 A | 11/1994 | Alden et al. | 335/206 |
| 5,377,547 A | 1/1995 | Kusakabe et al. | 73/723 |
| 5,381,355 A | 1/1995 | Birangi et al. | 364/724.01 |
| D358,784 S | 5/1995 | Templin, Jr. et al. | D10/96 |
| 5,436,824 A | 7/1995 | Royner et al. | 363/89 |
| 5,448,180 A | 9/1995 | Kienzler et al. | 326/15 |
| 5,469,150 A | 11/1995 | Sitte | 340/825.07 |
| 5,471,885 A | 12/1995 | Wagner | 73/862.041 |
| D366,000 S | 1/1996 | Karas et al. | D10/60 |
| D366,218 S | 1/1996 | Price et al. | D10/52 |
| 5,495,768 A | 3/1996 | Louwagie et al. | 73/706 |
| 5,498,079 A | 3/1996 | Price | 374/208 |
| 5,502,659 A | 3/1996 | Braster et al. | 364/571.01 |
| 5,524,333 A | 6/1996 | Hogue et al. | 29/593 |
| 5,524,492 A | 6/1996 | Frick et al. | 73/706 |
| 5,546,804 A | 8/1996 | Johnson et al. | 73/431 |
| 5,600,782 A | 2/1997 | Thomson | 395/182.02 |
| 5,606,513 A | 2/1997 | Louwagie et al. | 364/510 |
| 5,650,936 A | 7/1997 | Loucks et al. | 364/483 |
| 5,656,782 A | 8/1997 | Powell, II et al. | 73/756 |
| 5,665,899 A | 9/1997 | Willcox | 73/1.63 |
| 5,668,322 A | 9/1997 | Broden | 73/756 |
| 5,669,713 A | 9/1997 | Schwartz et al. | 374/1 |
| 5,670,722 A | 9/1997 | Moser et al. | 73/756 |
| 5,677,476 A | 10/1997 | McCarthy et al. | 73/29.01 |
| 5,710,552 A | 1/1998 | McCoy et al. | 340/870.21 |
| 5,754,596 A | 5/1998 | Bischoff et al. | 375/295 |
| 5,764,928 A | 6/1998 | Lanctot | 395/285 |
| 5,823,228 A | 10/1998 | Chou | 137/597 |
| 5,870,695 A | 2/1999 | Brown et al. | 702/138 |
| 5,899,962 A | 5/1999 | Louwagie et al. | 702/138 |
| 5,920,016 A | 7/1999 | Broden | 73/756 |
| 5,948,988 A | 9/1999 | Bodin | 73/706 |
| 5,954,526 A | 9/1999 | Smith | 439/136 |
| 5,955,684 A | 9/1999 | Gravel et al. | 73/866.5 |
| 5,973,942 A | 10/1999 | Nelson et al. | 363/21 |
| 5,983,727 A | 11/1999 | Wellman et al. | 73/724 |
| 5,988,203 A | 11/1999 | Hutton | 137/597 |
| 6,002,996 A | 12/1999 | Burks et al. | 702/188 |
| 6,005,500 A | 12/1999 | Gaboury et al. | 341/43 |
| 6,006,338 A | 12/1999 | Longsdorf et al. | 713/340 |
| 6,013,108 A | 1/2000 | Karolys et al. | 792/189 |
| 6,035,240 A | 3/2000 | Moorehead et al. | 700/2 |
| 6,038,927 A | 3/2000 | Karas | 73/706 |
| 6,047,219 A | 4/2000 | Eidson | 700/2 |
| 6,050,145 A | 4/2000 | Olson et al. | 73/706 |
| 6,058,441 A | 5/2000 | Shu | 710/100 |
| 6,059,254 A | 5/2000 | Sundet et al. | 248/678 |
| 6,105,437 A | 8/2000 | Klug et al. | 73/756 |
| 6,111,888 A | 8/2000 | Green et al. | 370/461 |
| 6,115,831 A | 9/2000 | Hanf et al. | 714/43 |
| 6,123,585 A | 9/2000 | Hussong et al. | 439/652 |
| 6,131,467 A | 10/2000 | Miyano et al. | 73/756 |
| 6,140,952 A | 10/2000 | Gaboury | 341/143 |
| 6,151,557 A | 11/2000 | Broden et al. | 702/47 |
| 6,175,770 B1 | 1/2001 | Bladow | 700/2 |
| D439,177 S | 3/2001 | Fandrey et al. | |
| D439,178 S | 3/2001 | Fandrey et al. | |
| D439,179 S | 3/2001 | Fandrey et al. | |
| D439,180 S | 3/2001 | Fandrey et al. | |
| D439,181 S | 3/2001 | Fandrey et al. | |
| 6,216,172 B1 | 4/2001 | Kolblin et al. | 709/253 |
| D441,672 S | 5/2001 | Fandrey et al. | |
| 6,233,532 B1 | 5/2001 | Boudreau et al. | 702/89 |
| 6,285,964 B1 | 9/2001 | Babel et al. | 702/121 |
| 6,295,875 B1 | 10/2001 | Frick et al. | 73/718 |
| 6,311,568 B1 | 11/2001 | Kleven | 73/861.42 |
| 6,321,166 B1 | 11/2001 | Evans et al. | 702/50 |
| 6,415,188 B1 | 7/2002 | Fernandez et al. | 700/67 |
| 6,421,570 B1 | 7/2002 | McLaughlin et al. | 700/2 |
| 6,460,094 B1 | 10/2002 | Hanson et al. | 710/8 |
| 6,484,107 B1 | 11/2002 | Roper et al. | 702/50 |
| 6,508,131 B1 | 1/2003 | Frick | 73/756 |
| 6,593,857 B1 | 7/2003 | Roper et al. | 340/870.3 |
| 2002/0011115 A1 | 1/2002 | Frick | 73/718 |
| 2002/0082799 A1 | 6/2002 | Pramanik | 702/130 |

FOREIGN PATENT DOCUMENTS

| | | |
|---|---|---|
| DE | 91 09 176.4 | 10/1991 |
| DE | 196 22 295 | 5/1996 |
| DE | 197 45 244 A1 | 4/1998 |
| DE | 299 03 260 U1 | 5/2000 |
| EP | 0 063 685 A1 | 11/1982 |
| EP | 0 167 941 A2 | 1/1986 |
| EP | 0 214 801 A1 | 3/1987 |
| EP | 0 223 300 A2 | 5/1987 |
| EP | 0 268 742 A1 | 6/1988 |
| EP | 0 639 039 A1 | 2/1995 |
| EP | 0 895 209 A1 | 2/1999 |
| EP | 0 903 651 A1 | 3/1999 |
| EP | 1 192 614 | 1/2003 |
| JP | 401313038 | 12/1989 |
| JP | 2000121470 | 10/1998 |
| JP | 2003/042881 | 2/2003 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/13417 | 9/1991 |
| WO | WO 91/18266 | 11/1991 |
| WO | WO 96/34264 | 10/1996 |
| WO | WO 98/48489 | 10/1998 |

| WO | WO 00/23776 | 4/2000 |

OTHER PUBLICATIONS

U.S. Appl. No. 09/867,961, filed May 30, 2001, Fandrey et al.
U.S. Appl. No. 09/671,495, filed Sep. 27, 2000, Behm et al.
U.S. Appl. No. 09/519,781, filed Mar. 7, 2000, Nelson et al.
U.S. Appl. No. 09/520,292, filed Mar. 7, 2000, Davis et al.
U.S. Appl. No. 09/519,912, filed Mar. 7, 2000, Nelson et al.
U.S. Appl. No. 09/672,338, filed Sep. 28, 2000, Nelson et al.
U.S. Appl. No. 09/638,181, filed Jul. 31, 2000, Roper et al.
U.S. Appl. No. 09/571,111, filed May 15, 2000, Westfield et al.
U.S. Appl. No. 09/564,506, filed May 4, 2000, Nord et al.
U.S. Appl. No. 09/667,289, filed Sep. 22, 2000, Westfield et al.
U.S. Appl. No. 09/667,399, filed Sep. 21, 2000, Behm et al.
U.S. Appl. No. 09/671,130, filed Sep. 27, 2000, Fandrey et al.
U.S. Appl. No. 10/125,286, filed Apr. 18, 2002, Behm et al.
Product Data Sheet No. 00813-0100-4378, "Model 751 Field Signal Indicator", by Rosemount Inc., Eden Prairie, Minnesota, (1997).
Product Data Sheet No. 00813-0100-4731, "APEX™ Radar Gauge", by Rosemount Inc., Eden Prairie, Minnesota, (1998).
Product Data Sheet No. 00813-0100-4640, "Model 3201 Hydrostatic Interface Unit", from the Rosemount Comprehensive Product Catalog, published 1998, by Rosemount Inc., Eden Prairie, Minnesota.
Product Data Sheet No. 00813-0100-4003, "Model 8800A", by Rosemount Inc., Eden Prairie, Minnesota, (1998).
Product Data Sheet No. 00813-0100-4773, "Model 8742C—Magnetic Flowmeter Transmitter with FOUNDATION™ Fieldbus", from the Rosemount Comprehensive Product Catalog, published 1998, by Rosemount Inc., Eden Prairie, Minnesota.
"Rosemount Model 8732C Magnetic Flowmeter Transmitter", by Rosemount Inc., Eden Prairie, Minnesota, (1998).
Product Data Sheet No. 00813-0100-4263, "Model 444 Alphaline® Temperature Transmitters", by Rosemount Inc., Eden Prairie, Minnesota, (1997).
Product Data Sheet No. 00813-0100-4769, "Model 3244MV Multivariable Temperature Transmitter with FOUNDATION™ Fieldbus", by Rosemount Inc., Eden Prairie, Minnesota, (1998).
Product Data Sheet No. 00813-0100-4724, "Models 3144 and 3244MV Smart Temperature Transmitters", by Rosemount Inc., Eden Prairie, Minnesota, (1998).
Product Data Sheet No. 00813-0100-4738, "Model 3095FB Multivariable™ Transmitter with Modbus™ Protocol", by Rosemount Inc., Eden Prairie, Minnesota, (1996, 1997).
Product Data Sheet No. 00813-0100-4001, "Model 3051 Digital Pressure Transmitter for Pressure, Flow, and Level Measurement", by Rosemount Inc., Eden Prairie, Minnesota, (1998).
Product Data Sheet No. 00813-0100-4698, "Model 2090F Sanitary Pressure Transmitter", by Rosemount Inc., Eden Prairie, Minnesota, (1998).
Product Data Sheet No. 00813-0100-4690, "Model 2088 Economical Smart Pressure Transmitter", by Rosemount Inc., Eden Prairie, Minnesota, (1998).
Product Data Sheet No. 00813-0100-4592, "Model 2024 Differential Pressure Transmitter", by Rosemount Inc., Eden Prairie, Minnesota, (1987-1995).
Product Data Sheet No. 00813-0100-4360, "Model 1151 Alphaline® Pressure Transmitters", by Rosemount Inc., Eden Prairie, Minnesota, (1998).
Product Data Sheet No. 00813-0100-4458, "Model 1135F Pressure-to-Current Converter", by Rosemount Inc., Eden Prairie, Minnesota, (1983, 1986, 1994).
"Single Chip Senses Pressure and Temperature," Machine Design, 64 May 21, 1992, No. 10.
Brochure: "Reduce Unaccounted-For Natural Gas with High-Accuracy Pressure Transmitters," Rosemount Inc. Measurement Division, Eden Prairie, Minnesota, ADS 3073, May 1991, pp. 1-4.
Technical Information Bulletin, "Liquid Level Trasmitter Model DB40RL Sanitary Sensor deltapilot," Endress + Hauser, Greenwood, Indiana, Sep. 1992, pp. 1-8.
"The Digitisation of Field Instruments" W. Van Der Bijl, Journal A, vol. 32, No. 3, 1991, pp. 62-65.
Specification Summary, "TELETRANS™ 3508-30A Smart Differential Pressure Transmitter," (undated) Bristol Babcock, Inc., Watertown, CT, 06795.
Specification Summary, "TELETRANS™ 3508-10A Smart Pressure Transmitter," (undated) Bristol Babcock, Inc., Watertown, CT, 06795.
Specification Summary, "AccuRate Advanced Gas Flow Computer, Model GFC 3308," (undated) Bristol Babcock, Inc., Watertown, CT, 06795.
Product Data Sheet PDS 4640, "Model 3201 Hydrostatic Interface Unit," Mar. 1992, Rosemount Inc., Eden Prairie, MN 55344.
Product Data Sheet PDS 4638, "Model 3001CL Flush-Mount Hydrostatic Pressure Transmitter," Jul. 1992, Rosemount Inc., Eden Prairie, MN 55344.
"Flow Measurement," Handbook of Fluid Dynamics, V. Streeter, Editor-in-chief, published by McGraw-Hill Book Company, Inc. 1961, pp. 14-4 to 14-15.
"Precise Computerized In-Line Compressible Flow Metering," Flow—Its Measurement and Control in Science and Industry, vol. 1, Part 2, Edited by R. Wendt, Jr., Published by American Institute of Physics et al, (undated) pp. 539-540.
"A Systems Approach," Dr. C. Ikoku, Natural Gas Engineering, PennWell Books, (undated) pp. 256-257.
"Methods for vol. Measurement Using Tank-Gauging Devices Can Be Error Prone," F. Berto, The Advantages of Hydrostatic Tank Gauging Systems, undated reprint from Oil & Gas Journal.
"Hydrostatic Tank Gauging—Technology Whose Time Has Come," J. Berto, Rosemount Measurement Division Product Feature, undated reprint from INTECH.
"Pressure Sensors Gauge Tank Level and Fluid Density," Rosemount Measurement Division Product Feature, undated reprint from Prepared Foods (Copyrighted 1991 by Gorman Publishing Company).
"Low Cost Electronic Flow Measurement System," Tech Profile, May 1993, Gas Research Institute, Chicago, IL.
"Development of an Integrated EFM Device for Orifice Meter Custody Transfer Applications," S.D. Nieberle et al., American Gas Association Distribution/Transmission Conference & Exhibit, May 19, 1993.
Advertisement, AccuRate Model 3308 Integral Smart DP/P/T Transmitter, (undated) Bristol Babcock, Inc., Watertown, CT 06795.
Advertisement, Model 3508 DP Transmitter, Control Engineering, Dec. 1992, Bristol Babcock, Inc., Watertown, CT 06795.
"Smart Transmitters Tear Up The Market," C. Polsonetti, INTECH, Jul. 1993, pp. 42-45.
"MicroLAN Design Guide", Dallas Semiconductor, Tech Brief No. 1, (undated).
"Bosch CAN Specification Version 2.0", by Robert Bosch GmbH, pp. 1-68 including pp. 1- and -2-, (Sep. 1991).
Product Data Sheet No. 00813-0100-4001, "Digital Pressure Transmitter for Pressure, Flow, and Level Measurement", by Rosemount Inc., (1998).
"Claudius Ptolemy (100?-170? AD)", M&C News, 7 pages, (Apr. 1994).
American National Standard , "Hydraulic Fluid Power-Solenoid Piloted Industrial Valves-Interface Dimensions for Electrical Connectors", National Fluid Power Association, Inc., 10 pages, (Aug. 1981).
2 pages downloaded from http://www.interlinkbt.com/PRODUCT/IBT_PROD/DN/CN-DM_PN/EURO-DP.HTM dated Sep. 15, 2000.
4 pages downloaded from http://www.interlinkbt.com/PRODUCT/IBT_PROD/dn/EUR-CON/euro-fwc.htm dated Sep. 15, 2000.
3 pages from TURK Cable Standards, by Turk, Inc., Minneapolis, Minnesota.
"Notification of Transmittal of the International Search Report or Declaration" for International application Serial No. PCT/US00/26561.
"Notification of Transmittal of the International Search Report or Declaration" for International application Serial No. PCT/US00/26488.

"Notification of Transmittal of the International Search Report or Declaration" for International application Serial No. PCT/US00/26563.

"Notification of Transmittal of the International Search Report or Declaration" for International application Serial No. PCT/US01/13993.

"Notification of Transmittal of the International Search Report or Declaration" for International application Serial No. PCT/US01/14521.

Invitation to Pay Additional Fees for International Application No. PCT/US2005/007328, filed Mar. 7, 2005; date of mailing: Nov. 8, 2005.

International Search Report for International Application No. PCT/US 03/27561, filed Mar. 9, 2003, dated Jun. 15, 2004.

Rosemount Reference Manual 00809-0100-4022,Rev AA, Jul. 2002, "Model 4600 Oil & Gas Panel Transmitter," 65 pages.

Transmitter Schematic, Sold Jul. 2002.

2002 Microchip Technology Inc., "Stand-Alone CAN Controller with SPI™ Interface," pp. 1-75, Mar. 1, 2002.

Notification of Transmittal of the International Search Report and the Written Opinion of the International Searching Authority for International Application No. PCT/US2005/007328 filed Mar. 7, 2005. Date of Mailing: Jan. 12, 2006.

LOW POWER PHYSICAL LAYER FOR A BUS IN AN INDUSTRIAL TRANSMITTER

FIELD OF THE INVENTION

The present invention relates generally to industrial process variable transmitters. In particular, the present invention relates to physical layers for digital communication protocols in such transmitters.

BACKGROUND OF THE INVENTION

Industrial process variable transmitters can be modular. Modular transmitters can be assembled with different feature modules to provide a desired process variable output protocol, field wiring housing, local display or other modular features. The feature modules are either mounted directly on the transmitter or, in the case of a display, within about 30 meters of the industrial transmitter.

Industrial process variable transmitters are frequently installed in areas of an industrial plant where incendive atmospheres may be present. Process variable output protocols are energy limited to avoid igniting the incendive atmospheres under fault conditions. Typically, an energy limited two wire 4–20 mA loop is used, and the loop provides all of the transmitter's energization.

Circuitry inside the transmitter that senses a process variable and that provides the process variable output uses most of the minimal amount of power available to the transmitter when the loop is operating at 4 mA. Very little power, typically 1–2 milliwatts, is available for energizing accessory loads and for digitally communicating with feature modules.

An extremely low power circuit is needed for energizing and communicating with feature modules without exceeding the available power limits in a transmitter.

SUMMARY OF THE INVENTION

Disclosed is a process variable transmitter that comprises connections that are mateable and demateable with an accessory load. The connections includes a bus contact and a common contact. The process variable transmitter also comprises a transmitter circuit that has a common conductor coupled to the common contact, and that has a supply conductor, a serial input and a serial output.

A receiver circuit in the process variable transmitter is coupled to the serial input and couples to the bus contact through a serial bus.

A supply limiter circuit draws a supply current from the supply conductor and provides a stored energy output. The supply limiter circuit provides a supply current limit.

A recessive driver circuit draws a drive current from the stored energy output and couples the drive current to the serial bus, the recessive driver circuit provides a drive current limit.

A dominant driver circuit couples between the serial output and the serial bus. The dominant driver circuit has a dominant state in which it conducts the drive current, and an inactive state in which the drive current is available to the accessory load.

These and various other features as well as advantages that characterize the present invention will be apparent upon reading of the following detailed description and review of the associated drawings.

DETAILED DESCRIPTION OF ILLUSTRATIVE EMBODIMENTS

In the embodiments described below, an industrial process variable transmitter is provided with a bus. The bus energizes any feature modules connected to the transmitter and also carries digital communication between the transmitter and the feature modules. The bus includes a physical layer that is an extremely low power circuit that provides both energization and communication on the same bus contact without exceeding the available power limits in a transmitter. The physical layer includes a first current limiter that sets a limit on the amount of power that the physical layer draws from a transmitter circuit and provides a stored energy output for the physical layer. The physical layer also includes a recessive bus driver that draws its drive current from the stored energy output and sets a further second drive current limit. The physical layer also includes a dominant driver circuit that has an inactive state in which drive current is available to the accessory load. The transmitter operates well within the power limitations of the 4–20 mA or other energy limited process variable output protocol and without interfering with process variable sensing or providing the process variable output. The physical layer can operate on 200 microamperes or less of the loop current because the physical layer has low switching losses during communication without significant loss of noise immunity.

CMOS logic, FET's and low power operational amplifiers and comparators are used to minimize static power consumption. Current limiting circuits control peak and average current consumption.

Figure 1:
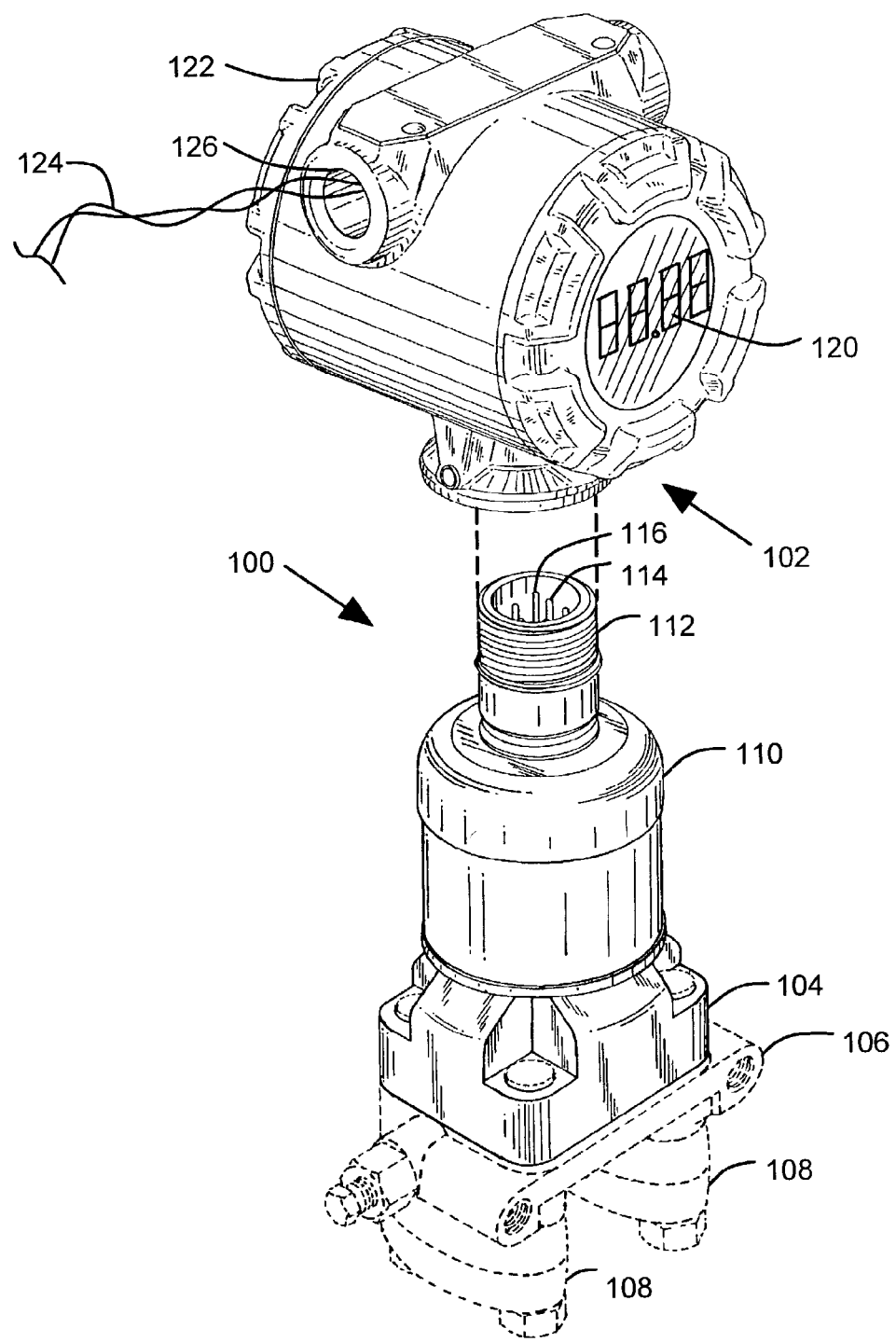
FIG. 1 illustrates an exploded view of a modular differential pressure transmitter and a feature module.

FIG. 1 illustrates an exploded view of a modular differential pressure transmitter 100 and a feature module 102. Transmitter 100 includes a pressure sensing module 104 that can be bolted to a coplanar flange 106 and flange adapter unions 108 illustrated in dashed lines. The flange adapter unions 108 are threaded and connect to threaded pipes that carry pressurized process fluids to the pressure transmitter 100 for sensing.

Transmitter 100 also includes a transmitter electronics housing 110 that is sealed to the pressure sensing module 104. The housing 110 encloses the transmitter's electronic circuits (not illustrated in FIG. 1) and includes an electrical connector 112 that is preferably hermetically sealed. The electrical connector 112 includes a number of contacts including a bus contact 114 and a common contact 116 for connecting the transmitter 100 to any of various feature modules or accessories. One such feature module is the feature module 102 that screws or threads on the electrical connector 112. The feature module 102 includes a liquid crystal display (LCD) circuit 120. LCD 120 displays the current value of the process variable sensed by the transmitter 100 or other data received from the transmitter 100. The LCD circuit 120 is connected to the bus contact 114 and the common contact 116. The LCD display circuit is energized from the bus contact 114 and also communicates digital data to and from the bus contact 114. The liquid crystal display (LCD) circuit 120 is coupled to the connections 114, 116. The process variable transmitter 100 energizes and controls the liquid crystal display circuit 120. The liquid crystal display circuit 120 can be disposed locally, as illustrated, or can be disposed in a location that is remote from the process variable transmitter 100 and convenient for viewing by an operator. The LCD 120 can be up to 100 feet from the transmitter 100. Feature modules such as a temperature sensor module or a barometric pressure sensor module can also be coupled to the connections 114, 116.

The feature module 102 also includes a field wiring compartment (not illustrated) that is closed by a compartment cover 122. Field wiring 124 from a process control system (not illustrated) passes through a threaded condulet opening 126 and connects to a two wire output interface of the transmitter 100. The connector 112 also includes contacts carrying the two wire output interface. The field wiring 124 energizes the transmitter 100.

The transmitter 100, in turn, energizes and controls the LCD display 120 by way of the bus contact 114 and the common conductor 116. In some instances, the common conductor 116 may be used as a return conductor for both the bus and the two wire interface. The circuitry of transmitter 100 is explained in more detail below in examples illustrated in FIGS. 3–8.

Figure 2:
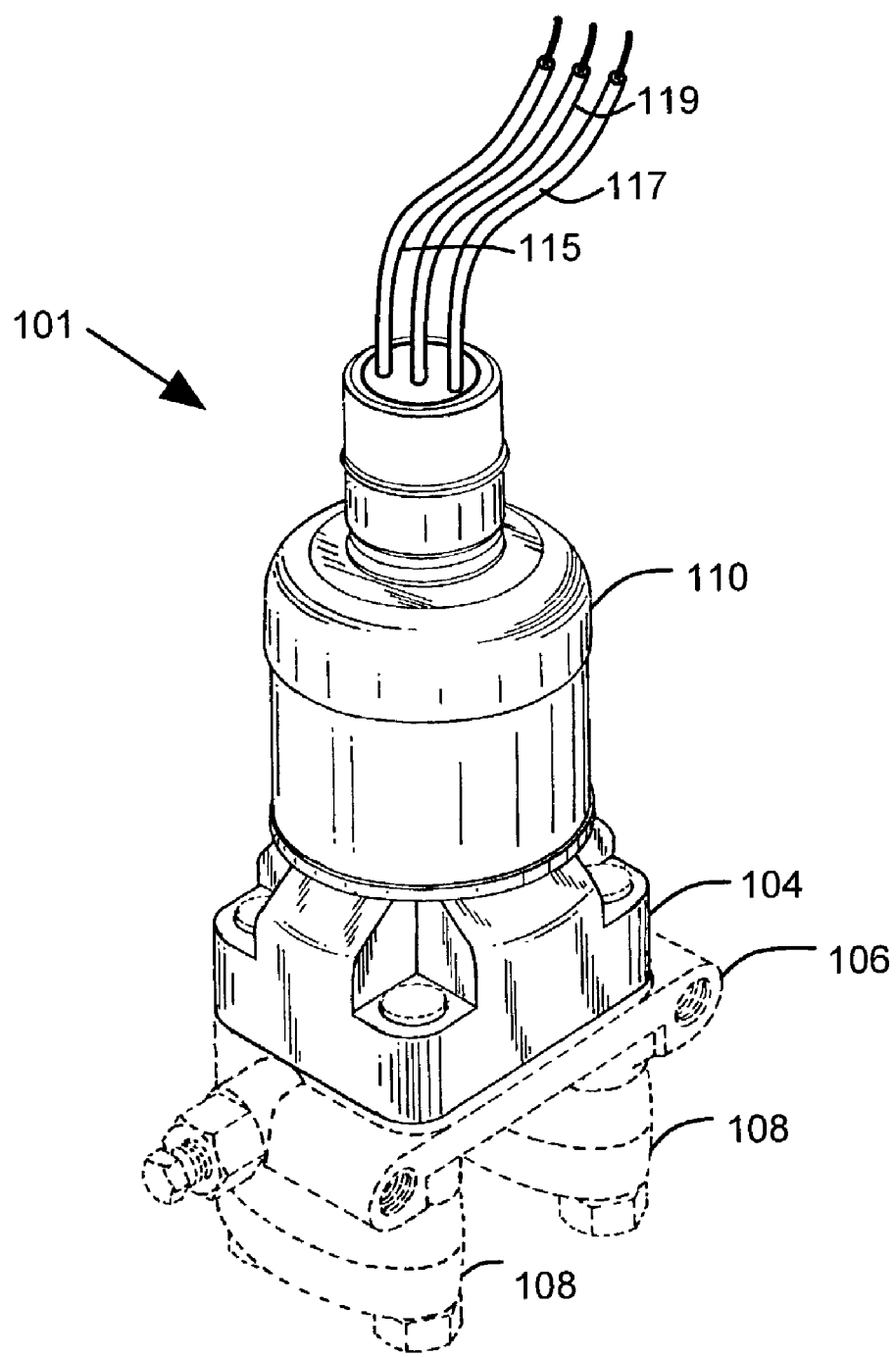
FIG. 2 illustrates a transmitter with pigtail connections.

FIG. 2 illustrates a transmitter 101 with pigtail connections 115, 117, 119. Reference numerals used in FIG. 2 that are the same as reference numerals used in FIG. 1 identify the same or similar features. In FIG. 2, the transmitter 101 does not have a threaded electrical connector, but instead has pigtails 115, 117, 119 for connecting the transmitter 101 to a bus or other feature modules or accessories. The arrangement shown in FIG. 2 can be used, for example, with a Rapidfire bus. The pigtails 115, 117, 119 are mateable and demateable with an accessory load by simple wire connections such as wire nuts, screw terminal blocks, or other known mateable and demateable connections.

Figure 3:
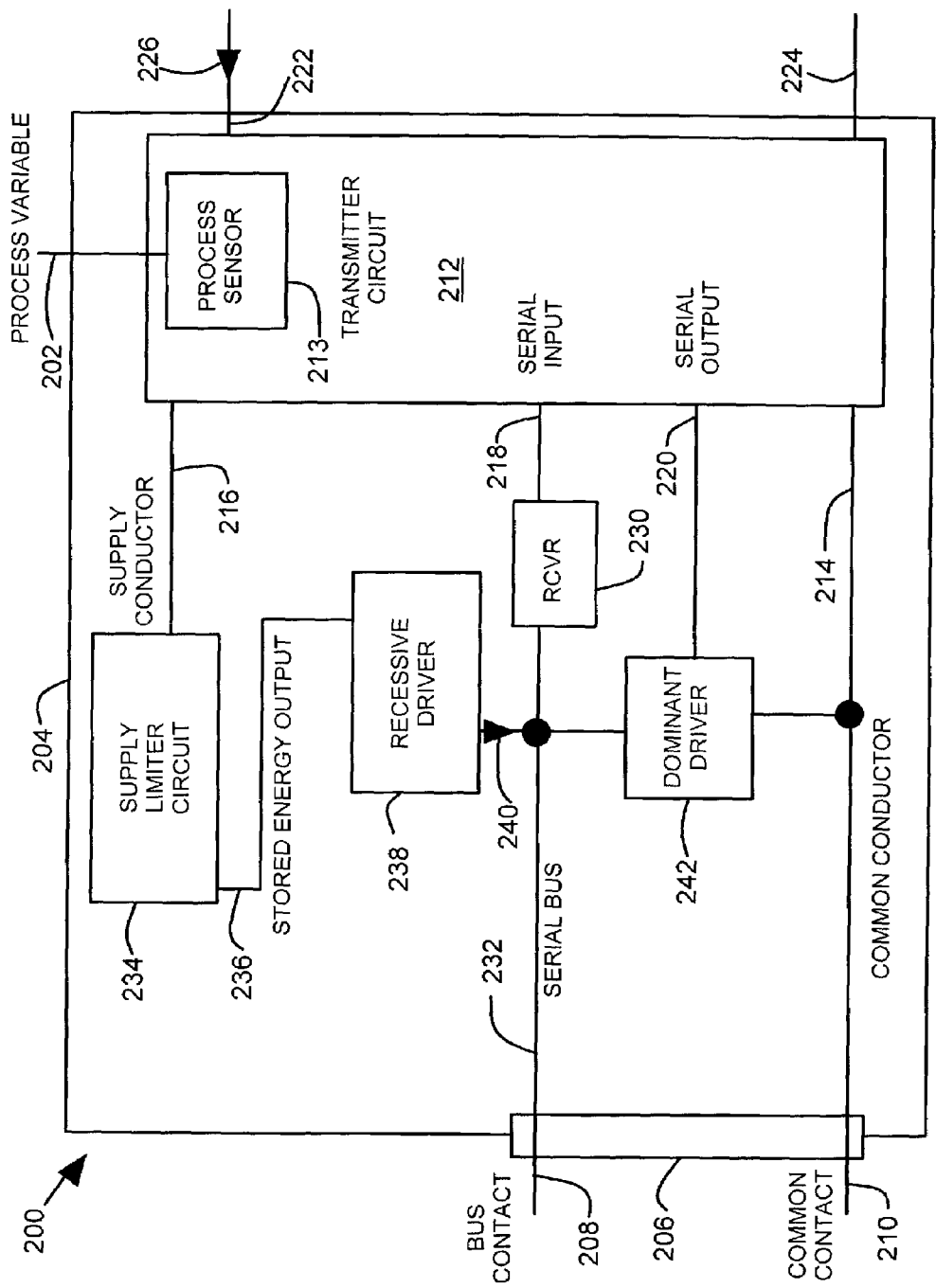
FIG. 3 illustrates a block diagram of a first embodiment of a process variable transmitter.

FIG. 3 illustrates a block diagram of a first embodiment of a process variable transmitter 200. Transmitter 200 senses a process variable 202. The process variable 202 can be differential pressure (as illustrated in FIG. 1), gage pressure, absolute pressure, flow, temperature, pH, fluid conductivity, density, chemical composition or other know process variables of materials handled in a process plant such as a chemical plant, a paper mill, a water treatment installation or the like.

The transmitter 200 includes a housing 204 that includes an electrical connector 206. The electrical connector 206 is mateable and demateable with an accessory load (such as feature module 102 illustrated in FIG. 1). The connector 206 includes a bus contact 208 and a common contact 210, which is grounded in some installations.

The transmitter 200 includes a transmitter circuit 212 that has a common conductor 214 coupled to the common contact 210. The transmitter circuit 212 provides a supply conductor 216, a serial input 218 and a serial output 220. The transmitter 200 includes a process variable sensor 213. In one preferred arrangement, the process sensor 213 comprises a pressure sensor.

The transmitter circuit 212 has a two wire transmitter output interface at transmitter output leads 222, 224 that draws a transmitter current 226 from a two wire process control bus such as field wiring 124 in FIG. 1. The transmitter circuit 212 provides a transmitter current limit on the two wire process control bus, typically about 25 milliamperes. The two wire process control loop provides all of the transmitter's energization. In a preferred arrangement, the two wire transmitter output interface comprises a 4–20 mA controlled current. HART digital signaling can also be superimposed on the 4–20 mA controlled current to provide digital communication over the control loop.

The transmitter 200 includes a receiver circuit 230 coupled to the serial input 218 and also coupled to the bus contact 208 by a serial bus 232. A supply limiter circuit 234 draws a supply current from the supply conductor 216 and provides a stored energy output 236. The supply limiter circuit 234 providing a supply current limit on the amount of current that it can draw from the supply conductor 216. The supply current limit is typically an extremely small amount such as 500 microamperes. The supply current limit ensures that the power demands of the physical layer circuit can't drive the transmitter output current over an alarm loop level (typically 3.5 mA), even if the bus is shorted.

The transmitter 200 includes a recessive driver circuit 238 that draws or derives a drive current 240 from the stored energy output 236. The recessive driver circuit 238 couples the drive current 240 to the serial bus 232. The recessive driver circuit 238 provides a drive current limit on the amount of driver current 240. The drive current limit is typically 5 milliamperes. If a storage capacitor 284 (described below in connection with FIG. 5) is depleted, the supply current limit circuit still limits the recharge rate of the storage capacitor 284 to 500 microamps, thereby keeping the 4–20 mA loop within the alarm low level. Alternatively, the recessive driver circuit limit is set at 5 mA to keep the storage capacitor 284 from being totally discharged on the first low state on the bus. The recessive driver current limit is set high enough to drive 100 feet of cable capacitance plus LCD input capacitance from a LOW state to a HIGH state in ⅔ths of a bit time.

The transmitter 200 also includes a dominant driver circuit 242 coupled between the serial output 220 and the serial bus 232. The dominant driver circuit 242 has a dominant state in which it conducts the drive current 240, and an inactive state in which the drive current 240 is available to the accessory load connected to the bus contact 208 and the common contact 210. During the inactive state, the recessive driver circuit 238 provides energization to the accessory load. The dominant driver circuit 242 switches back and forth between its dominant state and its inactive state to transmit digital data to the accessory load. In a preferred arrangement, the various non-hardware layers of the digital data is formatted according to a controller area network (CAN) protocol.

Figure 4:
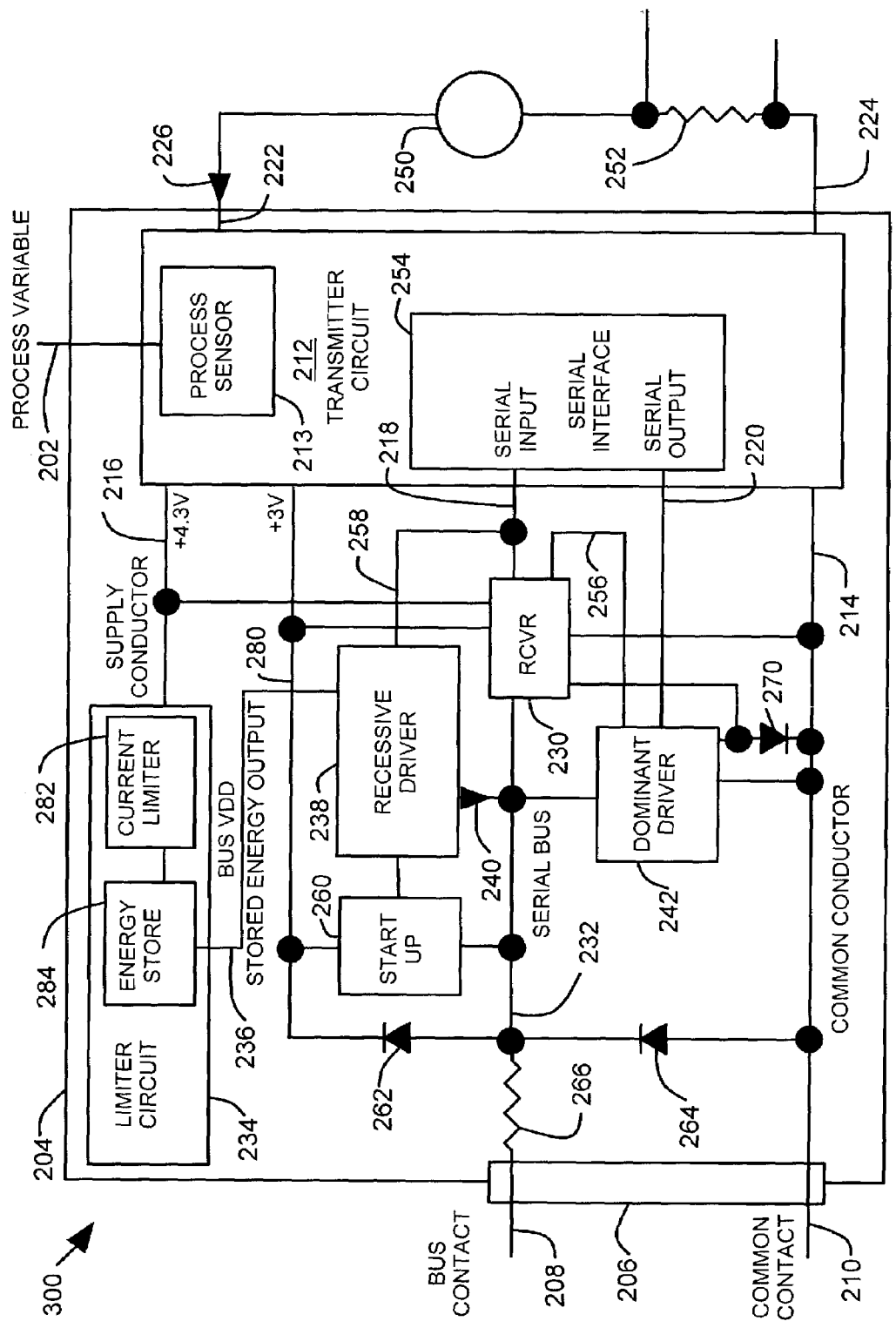
FIG. 4 illustrates a block diagram of a second embodiment of a process variable transmitter.

FIG. 4 illustrates a block diagram of a second embodiment of a process variable transmitter 300. Transmitter 300 is similar to transmitter 200 illustrated in FIG. 3, however, certain additional features are included in transmitter 300. Reference numerals used in FIG. 4 that are the same as reference numerals used in FIG. 3 identify the same or similar features.

In FIG. 4, the transmitter output leads 222, 224 are connected to a two wire 4–20 mA industrial control loop (also called a telemetry loop) that provides all of the energization to the transmitter 300. The two wire 4–20 industrial control loop is illustrated as a voltage source or power supply 250 in series with a load resistor 252. Typically the voltage across the load resistor 252 is coupled to a controller or a process control system.

Also in FIG. 4, a serial interface 254 is illustrated as part of the transmitter circuit 212. The serial interface 254 provides the serial input 218 and the serial output 220. The serial interface 254 is preferably part of a custom microprocessor, such as an ATMEL 8 bit microcontrol unit with CAN controller, ATMEL part number T89C51CC01 sold by ATMEL Corporation, 2325 Orchard Parkway, San Jose Calif. 95131 USA. An MCP2510 Stand-alone CAN controller with SPI interface from Microchip Technology, Inc. can also be used, for example, with a Rapidfire configuration.

In FIG. 4, the dominant driver circuit 242 provides feedforward coupling along a line 256 to the receiver circuit 230. The receiver 230 adjusts a receiver threshold responsive to the feedforward output 256. The feedforward coupling allows the receiver circuit output 218 to respond quickly to a change to a low logic state of the serial bus when the change of state is initiated by the dominant driver circuit 242. The quickly responding receiver circuit output 218 is coupled on line 258 to the recessive driver circuit 238, and the recessive driver circuit 238 quickly reduces drive current 240 during the low logic state to a low level to save power. The receiver 230 effectively generates a drive reduction output on line 258 that is active when the serial bus is in a LOW state. The drive reduction output on line 258 couples to the recessive driver circuit. The recessive driver circuit 238 reduces the drive current 240 responsive to the drive reduction output on line 258. The dominant driver circuit 242 generates the feedforward output 256 that is active after a change of state of the serial bus 232.

A startup circuit 260 couples to the serial bus 232. The startup circuit 260 provides current to the serial bus 232 during a startup interval. The serial bus 232 includes a voltage limiter circuit coupled between the serial bus 232 and the bus contact 208. The voltage limiter comprises two clamping diodes 262 coupled between the serial bus 232 and power supply rails, and also includes a current limiting resistor 266 in series between the serial bus 232 and the bus contact 266. The voltage limiter helps protect against static electricity discharged into the bus contact 208.

In this embodiment, the dominant driver 242 couples to a diode 270 that is biased to provide a 0.6 volt voltage pedestal above the common conductor voltage (dc common). When the dominant driver 242 is in an active or LOW state, the dominant driver 242 essentially connects the serial bus 232 to the diode 270. The LOW state on the serial bus 232 is thus 0.6 volts or more above the dc common level. Less power is consumed by avoiding discharging the capacitances connected to the serial bus 232 all the way down to the dc common level. 16.

A voltage difference between bus contact and the common contact is a regulated voltage difference over an operating temperature range and the receiver circuit is temperature compensated over the operating temperature range to accept the regulated voltage difference. When used in remote applications, this arrangement has the benefit of more uniform switching losses (fVppC) over the operating temperature range of the circuits. This enhances long runs of cables between the process variable transmitter and the remote device (LCD).

In addition to a supply conductor 216 at 4.3 volts, the transmitter circuit 212 also supplies a lower supply on line 280 at 3.0 volts. The HIGH level on the serial bus 232 is reduced to 3.0 volts or less, and power consumption is reduced.

The supply limiter circuit 234 includes a current limiter 282 and an energy store 284. The arrangement of the current limiter 282 and the energy store 284 allows the recessive driver circuit 238 to instantaneously provide a current 240 that is higher in amplitude than the instantaneous amplitude of the supply current on supply conductor 216.

Figure 5:
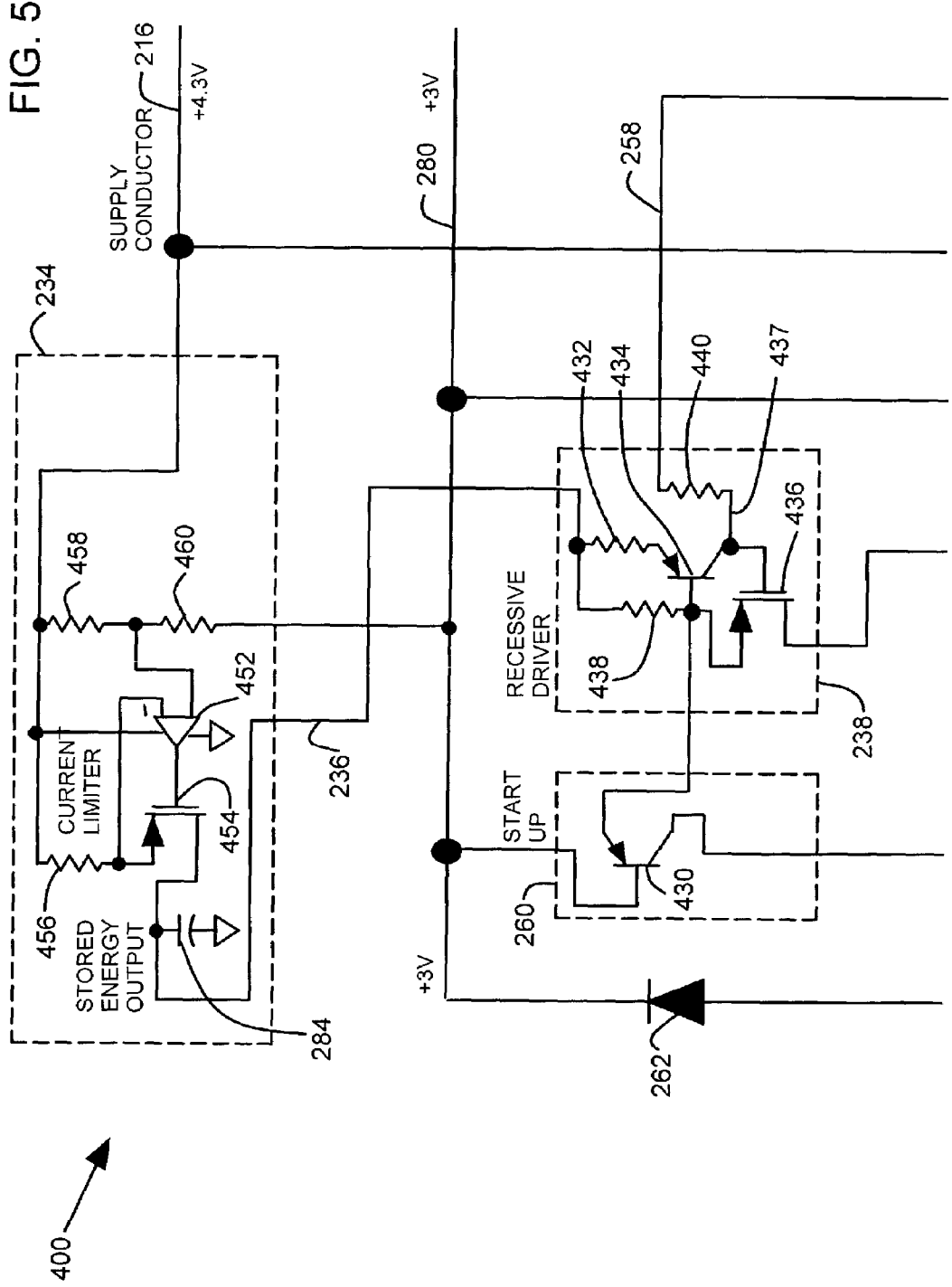
FIGS. 5–6 together illustrate a schematic diagram of a physical layer for a bus in a process variable transmitter.
Figure 6:
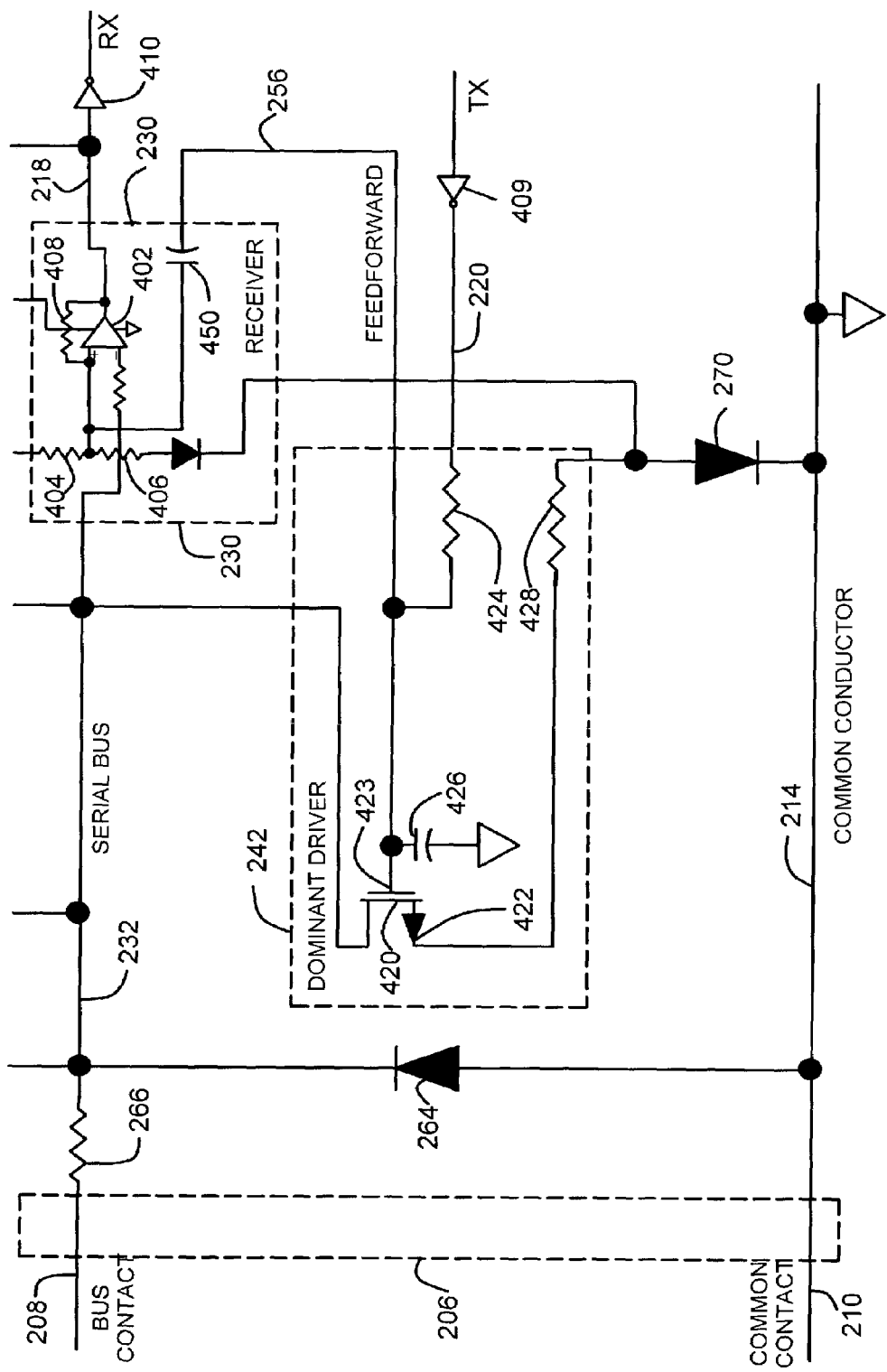

FIGS. 5–6 together illustrate one embodiment of a schematic diagram of a physical layer 400 for a bus in a process variable transmitter. A bottom edge of FIG. 5 can be arranged above a top edge of FIG. 6 to form a complete schematic. Physical layer 400 is similar to the bus physical layer of transmitter 300 illustrated in FIG. 4. Reference numerals used in FIGS. 5–6 that are the same as reference numerals used in FIG. 4 identify the same or similar features.

RECEIVER. In this embodiment, receiver 230 includes a low power CMOS comparator 402. The use of the comparator 402 allows use of a resistive divider 404, 406 to provide flexibility in receive threshold settings. A feedback resistor 408 provides a small amount of input hysteresis for improved noise immunity. Pursuant to this embodiment, a high input tolerant voltage CMOS inverter 410 level shifts the receive comparator output from 4.3 volts at 218 to 3.0 volts for input into a microprocessor.

DOMINANT DRIVER CIRCUIT. Referring to FIG. 6, the serial bus 232 is driven from a recessive (high) state to a dominant (low) state with a low On—Resistance FET 420 in the dominant driver circuit 242. The FET 420 has a high impedance input 423 that minimizes drive current consumption at the high impedance input. Several features are included in the dominant driver circuit 242 to manage current consumption. When the receive comparator 402 senses a low condition on the serial bus 232, the recessive driver circuit 238 is at least partially shut off to stop full driver current from flowing through the dominant driver 242 while it is in the dominant state. This helps to minimize power losses during communications. To further reduce losses, the source lead 422 of the FET 420 is connected in series with a diode 270 to clamp the low voltage level on the serial bus 232 to one diode drop (0.6 volts) above dc common at 214. This reduces the output voltage swing on the serial bus 232 which reduces communication power losses due to charging and discharging capacitive loads on the serial bus 232. The diode pedestal 270 limits the peak to peak signal amplitude on the serial bus 232 to about 3 volts to reduce communications current loss when driving a fully loaded bus. Diode 270 also preferably temperature compensates the signal level so it tracks both supply voltage on line 280 and the receive thresholds.

Power consumption during communications is dominated by the charging and discharging of load capacitance connected to the serial bus 232. The charging current I is approximated by $I = C * Vpp * f$, where C is load capacitance, Vpp is peak-to-peak voltage and f is frequency. Current can be reduced by limiting Vpp. The high state is preferably limited to about 3.6 Volts via the start up transistor 430. The peak-to-peak voltage is preferably limited to about 3 volts which minimizes current consumption when driving capacitive loads.

A benefit of the diode pedestal 270 is that it temperature compensates the signal level on bus 232 to line 236 and the receive thresholds. This is true because line 236 is one base-emitter junction voltage drop (Vbe) above line 280, and the low signal is clamped to one diode drop above ground and the receive thresholds are established via a resistive divider 404, 406 that is referenced at 2 diode drops above ground.

The FET 420 switches fast enough to generate inductive ringing on the edges so, resistor 424 and capacitor 426 were added to provide a low pass filter which slows the FET and rounds off the switching edges to avoid ringing. Resistor 428 is a small series resistor which also helps to reduce ringing.

DOMINANT DRIVER FEEDFORWARD. In one embodiment, a feedforward capacitor 450 is coupled between the FET input 423 and the resistive voltage divider 404, 406 to provide additional reduction in switching current losses by quickly turning the recessive driver 238 off when the dominant driver 242 transmits a dominant low bit. To minimize switching losses when the dominant driver 242 transmits a low bit, the recessive driver 238 needs to be shut off as soon as possible. The feed forward capacitor 450 provides an AC path to the positive input of the receive comparator 402. When the dominant driver 242 transmits a low, the comparator 402 senses the TX transition (from level shifter 409) and shuts the recessive driver 238 off before the serial bus 232 has had time to transition to a low state.

RECESSIVE DRIVER. Referring to FIG. 5, the recessive driver 238 can generate noise as well. Resistor 432 works with parasitic capacitance of transistor 434 to slow the action of transistor 434 and reduce switching noise.

The serial bus 232 is driven from a dominant low to a recessive high state with a current limited FET 436 in the recessive driver circuit 238. The FET 436 has a high impedance input 437 that minimize input current. In one embodiment, the recessive driver current limit is set at approximately 5 mA to prevent the bulk storage capacitor 284 from being discharged too quickly when going from a high to low state. The recessive driver 238 is turned on via a pulse width limited circuit. The pulse width can be limited by non-hardware layers of the communication protocol, by an RC time constant associated with the feedforward capacitor 450 or a combination of both. When the receive comparator 402 senses a high on the serial bus 232, the recessive driver 238 is latched in the ON state to source DC power to the serial bus 232. If the bus is accidentally shorted or if two feature devices try to communicate at once where an external device pulls the serial bus 232 low while the other device tries to pull it high, the dominant driver 242 dominates, or wins out over the recessive driver 238. In the CAN protocol, for example, this is defined as bit arbitration. Then the receive comparator 402 detects the low and the recessive driver shuts off after the pulse width time limit expires. This is done to limit the amount of power that is shunted to ground during a bit arbitration, (or when the bus happens to be shorted). If bit arbitration occurs, the CAN engine in the microprocessor senses that the bus is active, stops sending its message and wait until the end of the current message to retransmit.

Use of driver current that is recessive reduces switching losses by limiting the peak current that can flow from the serial bus 232 to dc common 214 during communications. In one embodiment, this allows 5 mA peak current flow from the bulk storage capacitor 284 to a device drawing power from the bus regardless of the voltage level on line 236. This allows the dominant (low) driver 242 to control the serial bus 232.

The receiver section 230 holds the recessive driver 238 ON when the serial bus 232 is high to source DC power to the serial bus 232. The comparator 402 shuts off the recessive driver transistor 436 when the serial bus 232 is LOW to stop current from flowing to the serial bus 232. The recessive driver current limit transistor 434 senses current through resistor 438 and limits the drive voltage on the recessive drive transistor 436.

The recessive driver 238 limits the time in which current is allowed to flow to the serial bus 232 during bit arbitration. The feedforward capacitor 450 is sized to set the time limit.

The recessive driver 238 is current limited to allow a dominant low driver (such as dominant driver 423 or a dominant driver in an accessory load) to override the recessive driver 238 and control the bus 232. In addition, the recessive driver 238 limits the amount of current that flows to ground during communications or bit arbitration thus reducing switching losses. The current limit in the recessive driver 238 is set high enough to provide adequate noise immunity and guarantee the driver can provide adequate power to an accessory load such as LCD 120 (FIG. 1) that draws all of its energization or power from the bus 232.

When the serial bus 232 is a CAN bus, the bus 232 may be low for a maximum of five bit times, as limited by non-hardware layers of the CAN protocol. The CAN protocol provides that the sixth bit be stuffed as a high bit to provide a synchronization edge. The bulk storage capacitor 284 stores charge during the low bits so that the physical layer can transfer the charge to the bus 232 during the next high bit to ensure the proper average power is maintained. The stuffed high bit provides an opportunity to transfer the charge. In order to do this the recessive driver must be capable of providing enough peak current so that in 1 bit time enough of the stored charge can be transferred to the accessory load to power it during 5 consecutive low bit times as allowed by the CAN protocol.

In addition, the driver must be able to pull a fully loaded CAN bus high in less than ⅔th of a bit time in order to meet timing requirements.

Recessive driver current is sensed through resistor 438. In one embodiment, when the voltage across it reaches about 0.6 Volts, transistor 434 turns on to limit current flow through the FET 436.

When the serial bus 232 is low, the recessive driver 238 is turned off to prevent current from flowing needlessly into ground via the serial bus 232. This is accomplished by monitoring the serial bus 232 with the receiver comparator 402. When the serial bus is low, the receiver comparator output on line 258 is high which turns the recessive driver 238 off. When the serial bus 232 is high, the comparator output 258 is low which turns the recessive driver 238 on to source power to the serial bus 232. This function is accomplished by connecting the output of the comparator 402 to the gate of the recessive driver FET 436 via resistor 440.

When the physical layer asserts a high bit, it sources current to the bus 232 via the recessive driver 238. If the bus 232 is held low due to a short or an accessory load pulling the bus 232 low, such as in bit arbitration, current would flow to ground and would be wasted. To minimize losses in this case, the recessive driver 238 attempts to pull the bus 232 high for a limited time. If the bus 232 is held low, the receive comparator 402 will not switch permanently to hold the recessive driver 238 on and the recessive driver 238 will shut off after a fixed time period. The feed forward capacitor 450 along with resistors 424, 404, 406, 408 set up an RC time limit for this purpose. When a TX high is asserted, a low voltage on line 220 is sent to a positive input of the receive comparator 402 via capacitor 450 which turns the recessive driver 238 on. If the bus 232 is held low, the receive comparator 402 does not permanently hold the recessive driver 238 on. Once capacitor 450 is fully charged there is no longer a low at the positive input of the comparator 402 so the recessive driver 238 shuts off. The time limit must be set long enough to ensure that a fully loaded bus can be pulled high before the comparator times out.

SUPPLY LIMITER & BULK STORAGE CAPACITOR. In this embodiment, DC power is sourced to accessory loads (such as an LCD) via the bus 232 whenever the bus 232 is in a recessive state. During a dominant state, charge is stored in the bulk capacitor 284 and then sourced as a high current pulse to the bus 232 once the bus 232 returns to a recessive state.

The physical layer power is provided via a first current limited source 234 that is designed to limit current drawn from the supply conductor to 500 uA typical. This supply limiter circuit 234 is essential to ensure that an overloaded bus 232 does not force the transmitter outside of its budgeted quiescent current range.

The supply limiter 234 limits direct current available to the bus 232 to prevent an overload from creating an on scale error on the 4–20 mA transmitter current loop. The bulk storage capacitor 284 stores charge when the bus 232 is low.

When the bus 232 is high, charge is transferred to a device being powered off the bus 232.

SUPPLY LIMITER CIRCUIT. As shown in FIG. 5, the supply limiter circuit 234 is critical to the operation of a 4–20 mA device that uses CAN communications. It ensures that an overloaded CAN bus can not draw enough current to drive the total transmitter output current above the maximum low alarm current allowed for the design. Operational amplifier 452 is a rail to rail I/O component which controls FET 454 to establish the current limit. Resistor 456 is the sense resistor. Resistors 458, 460 are a voltage divider that establishes a current limit reference. The current limit circuit is referenced between the line 280 and the line 216 to ensure an orderly start-up sequence of the transmitter.

In order to provide power to an accessory load on the bus 232 in an efficient manner, the physical layer must store charge while the bus 232 is low and transfer charge to the bus 232 when the bus 232 switches back high. The bulk capacitor 284 accomplishes this.

Since capacitor 284 is charged via FET 454 which is current limited, its voltage will drop momentarily when the bus 232 pulls high peak current from it. In one embodiment, capacitor 284 must be large enough in value to maintain a 3.0 Volt working voltage during communication. This ensures that a CAN device such as an LCD has sufficient supply voltage to operate. The capacitor 284 will be replenished between communication packets. There are two cases to consider. The first is after a string of 5 low bits. The recessive driver 238 will supply a current pulse to the bus 232 to keep the average current constant. The worse case condition is with an accessory load on the bus drawing maximum average current. Since capacitor 284 is preferably clamped to about 3.6 volts, it may drop at the start of a communications packet to provide peak current to the bus 232. The voltage drop is limited to an acceptable level because capacitor 284 charges up during low bits before transferring the stored charge on the next high bit.

This situation becomes a bit more complicated if the bus is fully loaded such as with a 100 foot long remote LCD cable. The voltage on capacitor 284 will drop as it charges the load during communications. For simplicity, a CAN device such as an LCD does not need to draw power during a communications packet. The accessory load has enough of its own bulk capacitance to ride through the communication event. The worse case condition would be when a string of 1's and 0's is being transmitted. By design, the current required to drive this, (Iload=Cload* Vpp * f), is less the CAN current limit so the voltage on capacitor 284 will not drop. In fact, it will charge up and begin powering the bus which means the assumption that the LCD is not powered during communications is a conservative one. In addition, the current consumed to drive the maximum specified capacitive load must be low enough to allow capacitor 284 to recharge between messages.

The second case to consider is ripple due to bit arbitration. In this case the recessive driver 238 will supply current to the bus 232 for the entire fixed time limit set by the feedforward capacitor 450. Capacitor 284 is large enough in value to keep the ripple below 100 mV in this case. The bulk capacitor 284 needs to be recharged between arbitration events. Since an event can only happen once per message maximum, there is plenty of time to charge capacitor 284.

STARTUP CIRCUIT. In order to start-up properly when power is first applied or to recover from a shorted CAN bus, there needs to be an alternate path that sources current to the bus. To meet this requirement, a PNP transistor 430 turns on to source power to the bus after the bulk storage capacitor is fully charged. The startup circuit 260 pulls the CAN bus high at start up or upon fault recovery after the bus has been shorted to ground. The startup circuit 260 provides an orderly power up and efficient use of power by allowing the bulk capacitor 284 to fully charge before sourcing any current to the bus. The CAN physical layer turns the recessive driver 238 off when the bus 232 is low to conserve current. This poses a problem at start up or after the bus has been shorted to ground. Since the bus is low in either of these cases, the recessive driver will be turned off. Nothing would pull the bus high to start it up or recover form a shorted condition. A bipolar PNP transistor 430 provides the pull up path to perform this function. The emitter of the transistor 430 is connected to line 236 by way of the resistor 438, the base is connected to line 280 and the collector is connected to the bus 232. In this embodiment, once line 236 reaches about 3.6 Volts, transistor 430 will turn on and source current to the bus 232. This creates a 3.6 Volt rail 236 which is sufficient for the physical layer requirements. Once the rail 236 is at 3.6 Volts, capacitor 284 is fully charged so there is no where to store additional charge. It is acceptable to source current to the bus as a pull up mechanism. If the bus is shorted, current will flow to ground but line 236 will be fixed at 3.6 Volts. If there is no DC load on the bus the current will flow through transistor 430 base/emitter junction and into the 3.0 Volt rail to be reused. An additional benefit is that the physical layer draws a fixed current at all times so that the DC power limit circuit is not in a dynamic application and thereby keeping switched loads associated with the serial bus isolated from the 4.3 volt internal rail and from the 4–20 mA loop regulation circuitry. This allows the use of a relatively slow, low power OpAmp 452.

Figure 7:
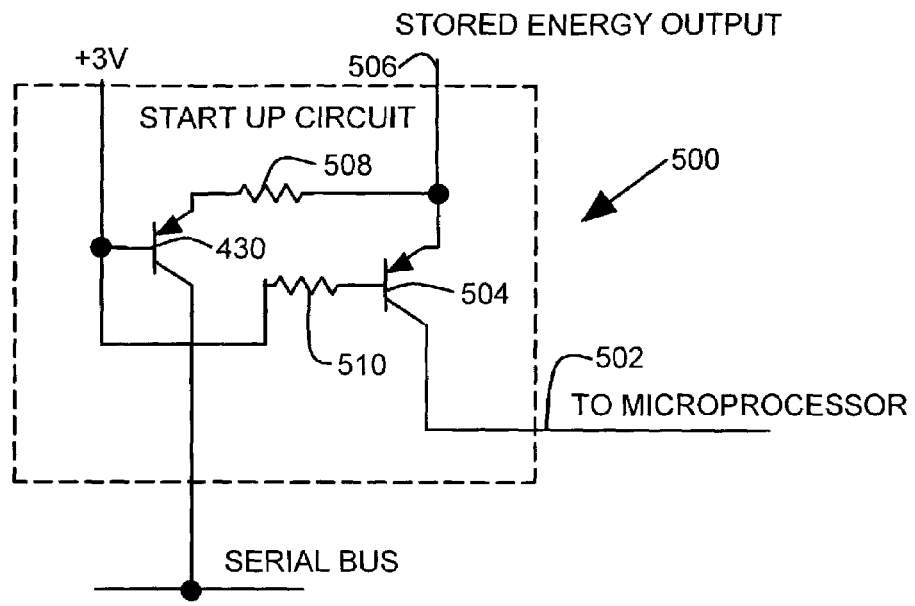
FIG. 7 illustrates a schematic circuit diagram of an alternative embodiment of a start up circuit.

MICROPROCESSOR. In one embodiment, the CAN Engine can reside within a custom microprocessor made by ATMEL. It performs error checking and drives the transmit and receive ports RX, TX per CAN protocol. The CAN engine is not a part of the physical layer but the design of the physical layer takes into account the characteristics of the non-physical layers in the CAN engine. FIG. 7 illustrates a schematic circuit diagram of an alternative embodiment of a start up circuit 500 that includes a low CAN voltage detect diagnostic output 502. In a preferred arrangement, the diagnostic output is indicative of stored energy, and a microprocessor receives the diagnostic output. In this circuit 500, transistor 504 turns on when the stored energy output 506 is up to about 3.6 Volts and sends a high voltage on line 502 to a microprocessor indicating a stable voltage is established. Resistor 508 causes the voltage on line 506 to rise high enough to ensure that transistor 504 turns on. Resistor 508 is low enough resistance to keep line 506 as near to 3.6 Volts as possible. Resistor 510 is much larger resistance than Resistor 508. Resistor 510 limits the current that flows through transistor 430's base/emitter junction and ensures that transistor 430 turns on and saturates.

Figure 8:
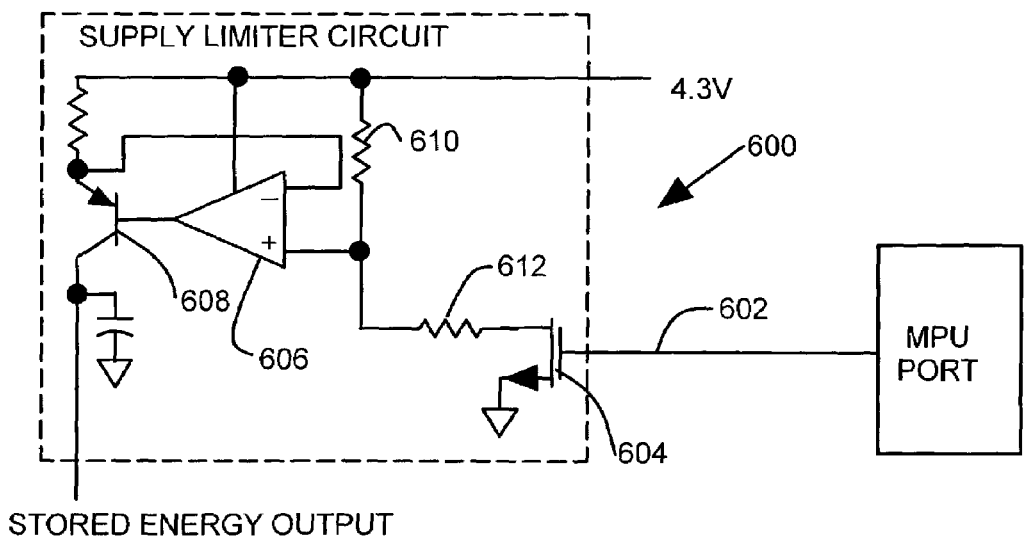
FIG. 8 illustrates a schematic diagram of an alternative embodiment of a supply limiter circuit.

FIG. 8 illustrates a schematic diagram of an alternative embodiment of a supply limiter circuit 600. The limiter circuit 600 provides a software and/or hardware selectable DC current limit threshold for versatility. If port 602 is low, transistor 604 will be off and amplifier 606 will be saturated high to turn the current in transistor 608 off. If port 602 is high, transistor 604 is on and a current limit threshold is established via voltage divider 610, 612. Two thresholds can be selected in this configuration. Additional thresholds can be made available if additional ports are utilized.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the process variable transmitter while maintaining substantially the same functionality without departing from the scope and spirit of the present invention. The teachings of the present invention can be applied to other process instruments without departing from the scope and spirit of the present invention.

What is claimed is:

1. A process variable transmitter, comprising:
   connections that are mateable and demateable with an accessory load; the connections including a bus contact and a common contact;
   a transmitter circuit having a common conductor coupled to the common contact, and having a supply conductor, and having a serial input and a serial output;
   a receiver circuit coupled to the serial input and coupled to the bus contact by a serial bus;
   a supply limiter circuit drawing a supply current from the supply conductor and providing a stored energy output; the supply limiter circuit providing a supply current limit;
   a recessive driver circuit drawing a drive current from the stored energy output and coupling the drive current to the serial bus, the recessive driver circuit providing a drive current limit; and
   a dominant driver circuit coupled between the serial output and the serial bus; the dominant driver circuit having a dominant state in which it conducts the drive current to the common conductor, and an inactive state in which the drive current is available to the accessory load.

2. The process variable transmitter of claim 1 wherein the transmitter circuit has a two wire transmitter output interface that draws a transmitter current from a two wire process control bus, the transmitter circuit providing a transmitter current limit.

3. The process variable transmitter of claim 2 wherein the two wire process control loop provides all of the transmitter's energization.

4. The process variable transmitter of claim 3 wherein the two wire transmitter output interface comprises a 4–20 mA controlled current.

5. The process variable transmitter of claim 1 wherein the recessive driver provides energization to the accessory load.

6. The process variable transmitter of claim 1 wherein the dominant driver switches back and forth between its dominant state and its inactive state to transmit digital data to the accessory load.

7. The process variable transmitter of claim 6 wherein the recessive driver provides energization to the accessory load when the dominant driver is in its inactive state.

8. The process variable transmitter of claim 7 wherein the digital data is formatted according to a controller area network (CAN) protocol.

9. The process variable transmitter of claim 1, further comprising:
   a startup circuit coupled to the serial bus, the startup circuit providing current to the serial bus during a startup interval.

10. The process variable transmitter of claim 1 wherein the serial bus includes a voltage limiter circuit.

11. The process variable transmitter circuit of claim 1 wherein the transmitter circuit includes a pressure sensor.

12. The process variable transmitter of claim 1 wherein the receiver generates a drive reduction output that is active when the serial bus is in a LOW state, and the drive reduction output couples to the recessive driver circuit.

13. The process variable transmitter of claim 12 wherein the recessive driver circuit reduces the drive current responsive to the drive reduction output.

14. The process variable transmitter of claim 1 wherein the dominant driver circuit generates a feedforward output that is active after a change of state of the serial output, the feedforward output coupling to the receiver.

15. The process variable transmitter of claim 14 wherein the receiver adjusts a receiver threshold responsive to the feedforward output.

16. The process variable transmitter of claim 1 wherein a voltage difference between bus contact and the common contact is a regulated voltage difference over an operating temperature range and the receiver circuit is temperature compensated over the operating temperature range to accept the regulated voltage difference.

17. The process variable transmitter of claim 1 further comprising a liquid crystal display (LCD) circuit that is coupled to the connections, the process variable transmitter energizing and controlling the liquid crystal display circuit.

18. The process variable transmitter of claim 17 wherein the liquid crystal display circuit is disposed in a location that is remote from the process variable transmitter.

19. The process variable transmitter of claim 1 further comprising a temperature sensor module that is coupled to the connections, the process variable transmitter communicating with and energizing the temperature sensor module.

20. The process variable transmitter of claim 19 wherein the temperature sensor module is disposed in a location that is remote from the process variable transmitter.

21. The process variable transmitter of claim 1 further comprising a pressure sensor module that is coupled to the connections, the process variable transmitter communicating with and energizing the pressure sensor module.

22. The process variable transmitter of claim 21 wherein the pressure sensor module is disposed in a location that is remote from the process variable transmitter.

23. The process variable transmitter of claim 1 wherein the startup circuit generates a diagnostic output indicative of stored energy, and the process variable transmitter further comprises a microprocessor receiving the diagnostic output.

24. The process variable transmitter of claim 1 further comprising a microprocessor having a microprocessor port coupled to the supply limiter circuit, the microprocessor controlling the magnitude of the supply current limit.

* * * * *